United States Patent
Hsiao et al.

(10) Patent No.: US 7,500,302 B2
(45) Date of Patent: Mar. 10, 2009

(54) PROCESS FOR FABRICATING A MAGNETIC RECORDING HEAD WITH A LAMINATED WRITE GAP

(75) Inventors: Wen-Chien Hsiao, San Jose, CA (US);
Terence Lam, Cupertino, CA (US);
Yinshi Liu, Foster City, CA (US);
Michael Yang, San Jose, CA (US);
Samuel Yuan, Saratoga, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 427 days.

(21) Appl. No.: 11/104,212

(22) Filed: Apr. 11, 2005

(65) Prior Publication Data

US 2006/0230602 A1    Oct. 19, 2006

(51) Int. Cl.
*G11B 5/127* (2006.01)
*H04R 31/00* (2006.01)

(52) U.S. Cl. ............ 29/603.14; 29/603.13; 29/603.15; 29/603.16; 29/603.18; 216/65; 360/122; 360/317; 427/127; 427/128; 451/5; 451/41

(58) Field of Classification Search . 29/603.13–603.16, 29/603.18; 360/122, 126, 317; 427/127, 427/128

See application file for complete search history.

(56) References Cited

U.S. PATENT DOCUMENTS

| | | | |
|---|---|---|---|
| 4,180,835 A | 12/1979 | Okumura et al. | |
| 4,742,412 A | 5/1988 | Kuriyama | 360/119 |
| 4,768,118 A | 8/1988 | Kuriyama | 360/121 |
| 4,780,779 A | 10/1988 | Pisharody et al. | |
| 4,825,318 A | 4/1989 | Hoo et al. | |
| 5,001,589 A | 3/1991 | Rask et al. | 360/120 |
| 5,111,352 A | 5/1992 | Das et al. | |
| 5,157,570 A | 10/1992 | Shukovsky et al. | |
| 5,173,822 A | 12/1992 | Kuriyama et al. | 360/120 |
| 5,210,668 A | 5/1993 | Sillen et al. | 360/120 |
| 5,537,278 A | 7/1996 | Yaegashi et al. | |

(Continued)

FOREIGN PATENT DOCUMENTS

JP    2002140803    5/2002

(Continued)

OTHER PUBLICATIONS

Thomson Delphion; Use of Tantalum to Control the Soft Magnetic Properties of Permalloy Pole Tip P2 in Inductive Heads; Oct. 1993; IBM Technical Disclosure Bulletin.

*Primary Examiner*—Paul D Kim

(57) ABSTRACT

Embodiments of the present invention recite a process for fabricating a write gap structure for a magnetic recording head. In one embodiment, at least one layer of inert material is deposited which is disposed proximate to the P2 pole of a magnetic recording head. A layer of magnetic material is deposited which is disposed between the layer of inert material and the P1 pedestal (P1P) of the magnetic recording head. In embodiments of the present invention, a second layer of inert material is deposited which is disposed between the layer of magnetic material and the P1P of the magnetic recording head. In embodiments of the present invention, the throat height of the write gap structure is defined wherein the layer of magnetic material and the inert layer only overlie a portion of the P1 pedestal of the magnetic recording head.

4 Claims, 17 Drawing Sheets

U.S. PATENT DOCUMENTS

| | | | |
|---|---|---|---|
| 5,558,944 A | 9/1996 | Terunuma | 428/611 |
| 5,621,595 A | 4/1997 | Cohen | 360/126 |
| 5,729,413 A | 3/1998 | Gooch et al. | |
| 5,812,350 A | 9/1998 | Chen et al. | 360/126 |
| 6,091,582 A | 7/2000 | Komuro et al. | 360/126 |
| 6,301,075 B1 | 10/2001 | Sato | 360/126 |
| 6,456,461 B1 | 9/2002 | Sato | 360/126 |
| 6,538,846 B1 | 3/2003 | Sato | 360/126 |
| 6,600,629 B2 | 7/2003 | Kanada et al. | 360/120 |
| 6,624,972 B1 | 9/2003 | Nishida et al. | 360/126 |
| 6,724,572 B1 | 4/2004 | Stoev et al. | |
| 6,731,458 B2 | 5/2004 | Watanabe et al. | |
| 6,751,053 B2 | 6/2004 | Watanabe et al. | 360/126 |
| 6,801,393 B2 | 10/2004 | Oki et al. | 360/126 |
| 6,833,976 B2 | 12/2004 | Hsu et al. | |
| 6,851,178 B2 | 2/2005 | Han et al. | |
| 6,999,276 B2 | 2/2006 | Kanada et al. | |
| 7,086,139 B2 * | 8/2006 | Lee et al. | 29/603.07 |
| 7,133,241 B2 | 11/2006 | Che et al. | |
| 2003/0202278 A1 | 10/2003 | Chen et al. | |
| 2003/0214753 A1 | 11/2003 | Hsu et al. | 360/119 |
| 2004/0027716 A1 | 2/2004 | Chen et al. | |
| 2004/0179296 A1 | 9/2004 | Sato | |
| 2005/0219745 A1 | 10/2005 | Hixson-Goldsmith et al. | |

FOREIGN PATENT DOCUMENTS

| | | | |
|---|---|---|---|
| WO | WO 01/33559 A1 | 5/2001 | |

* cited by examiner

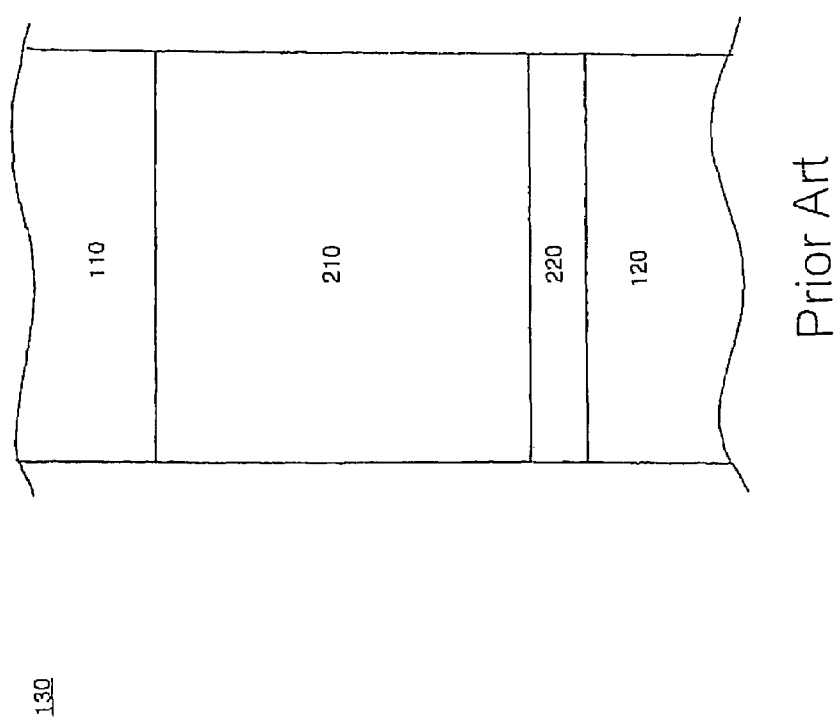

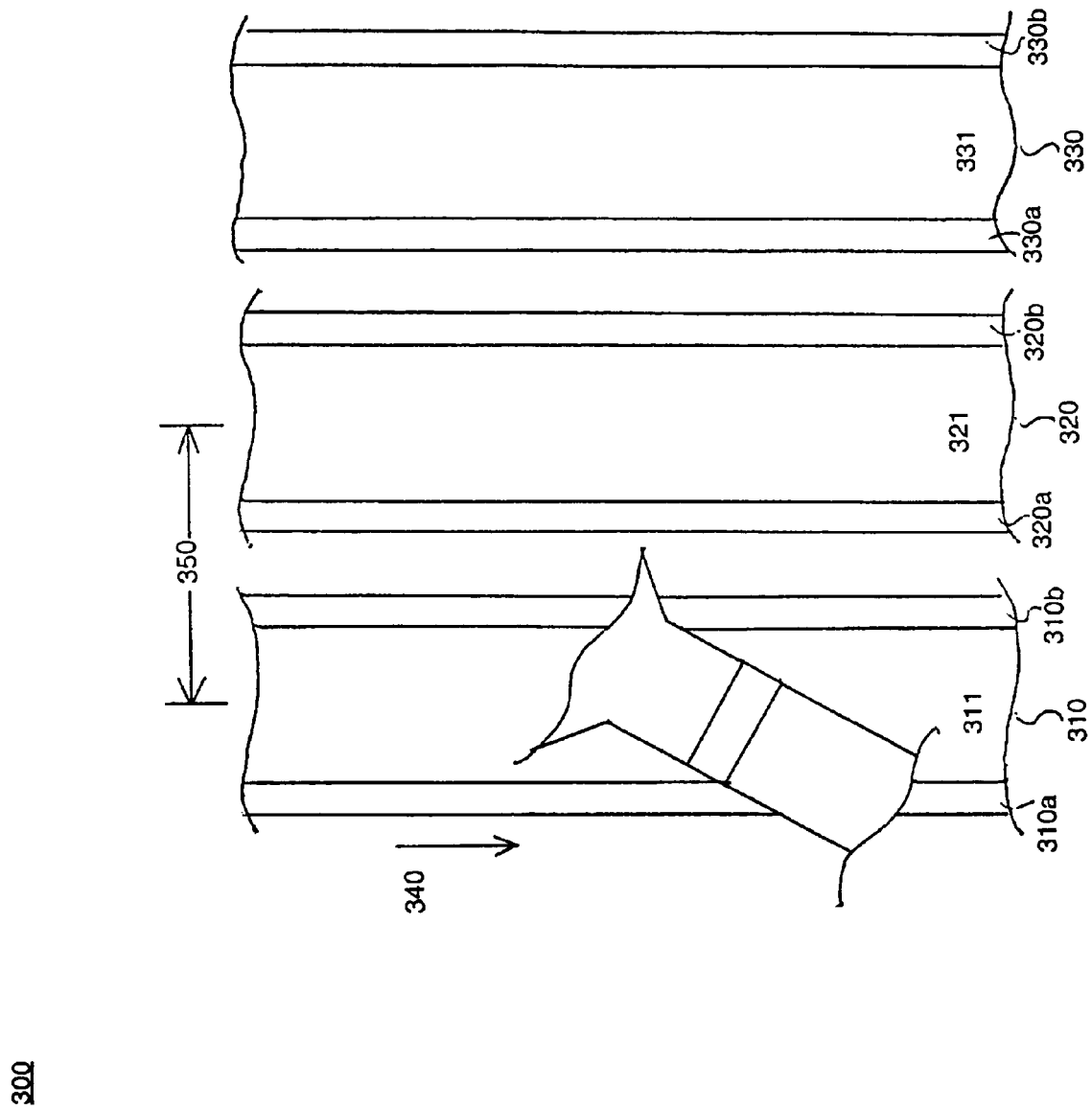

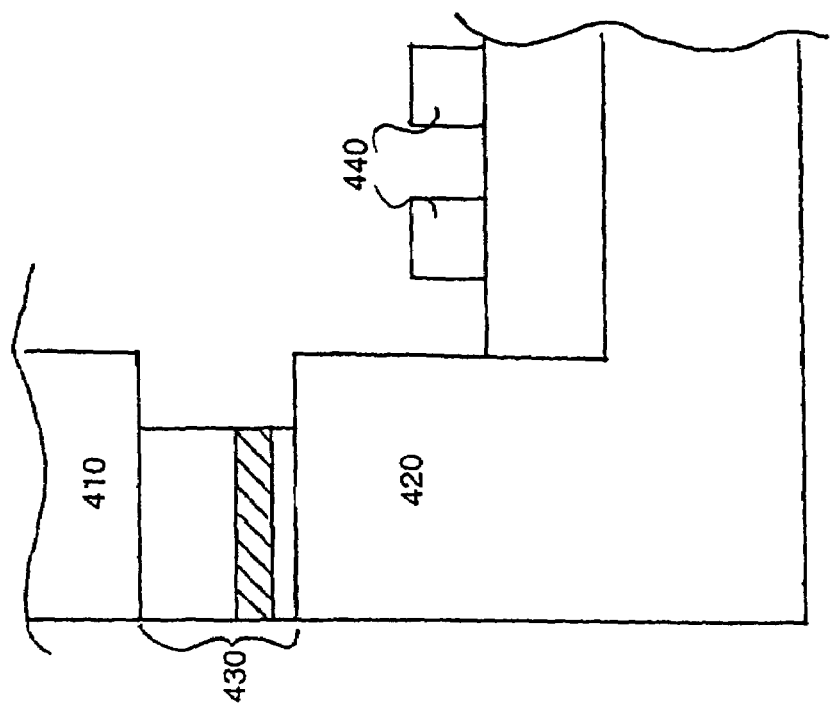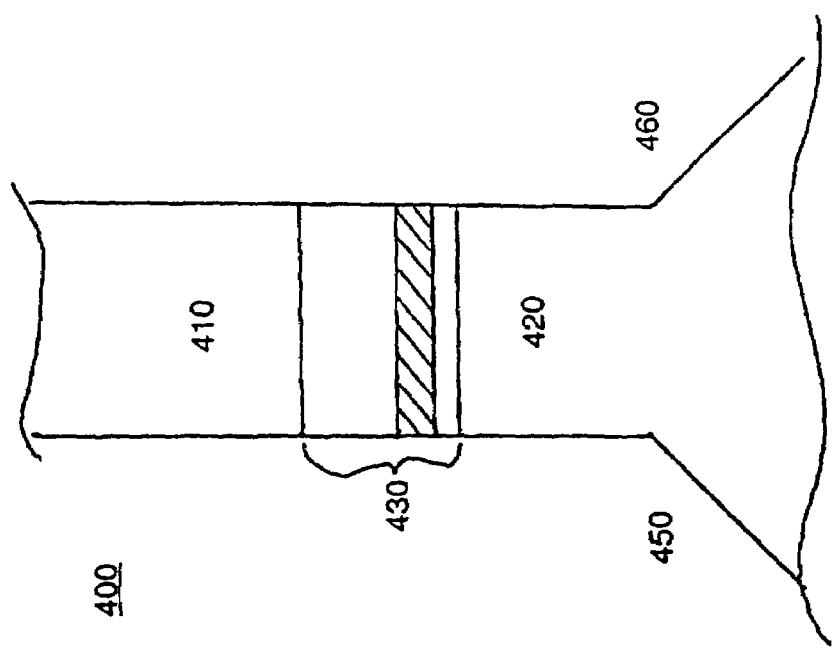

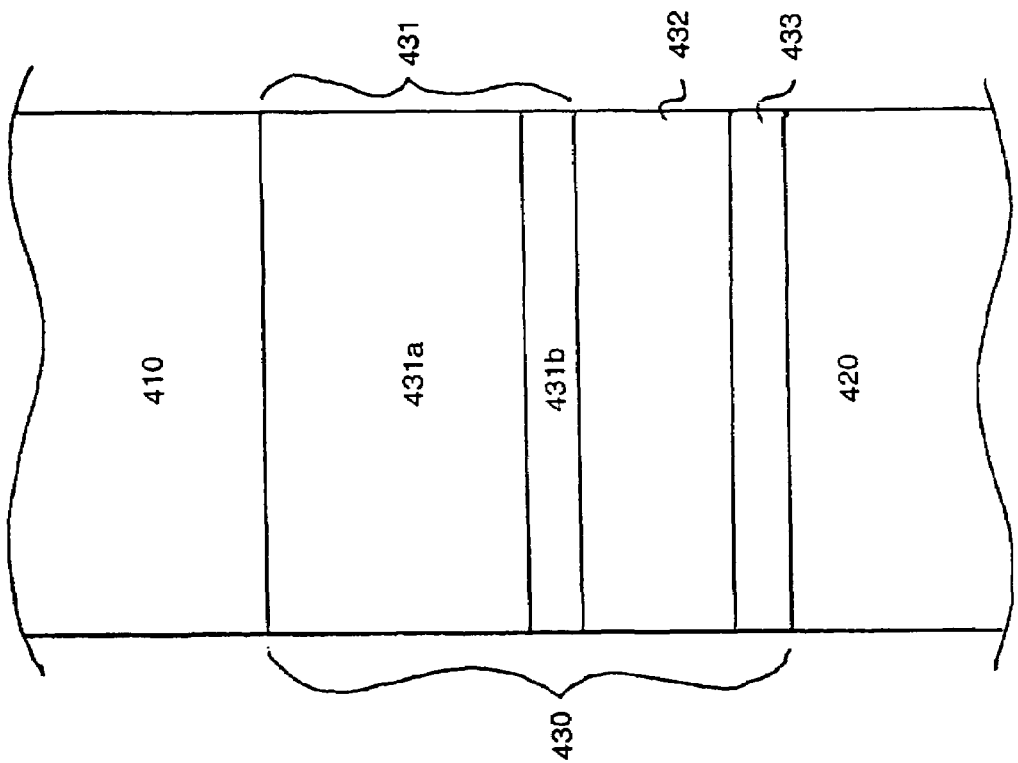

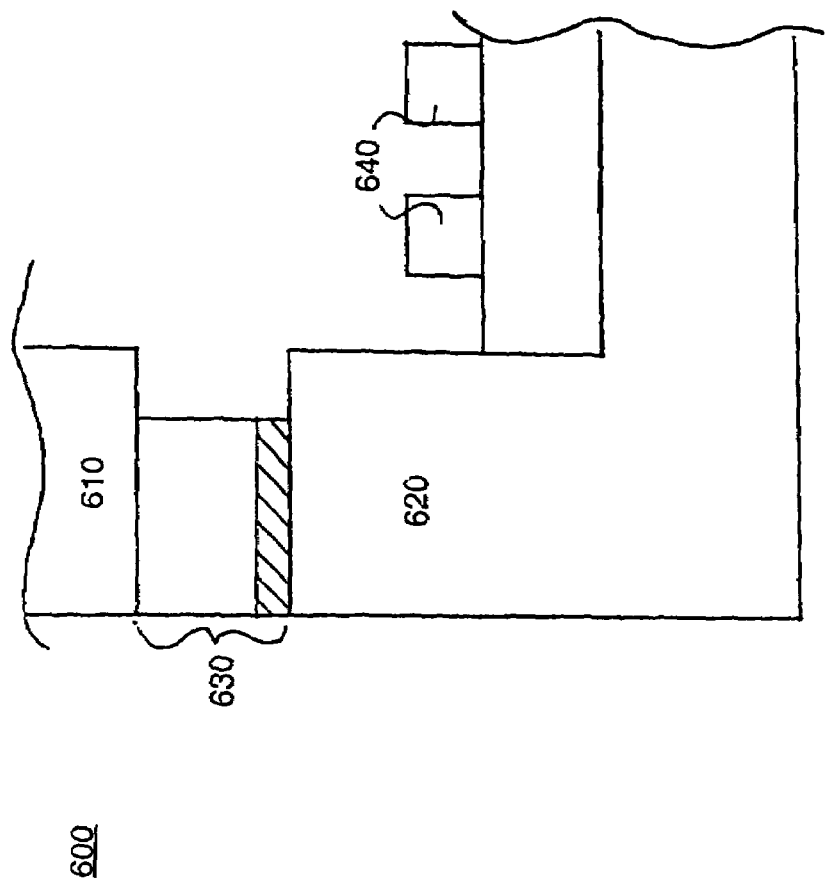
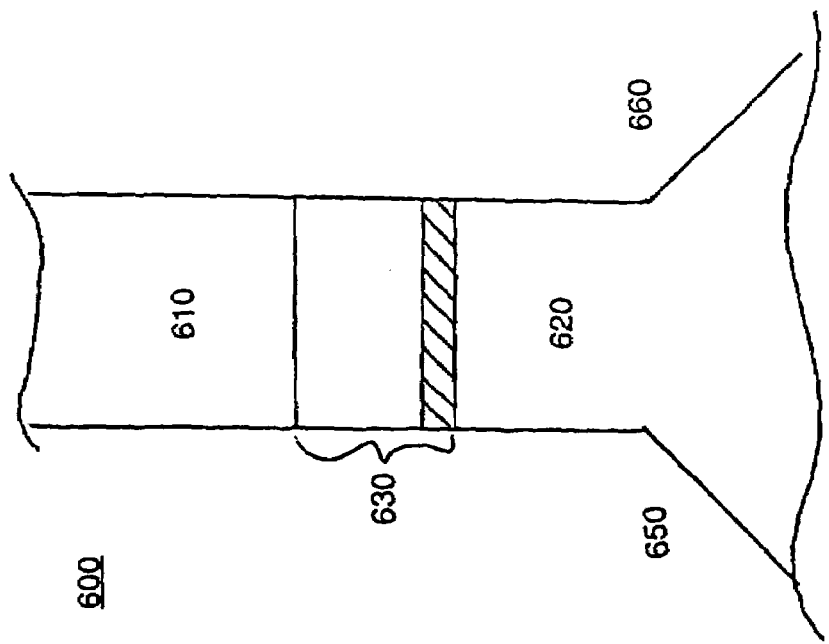

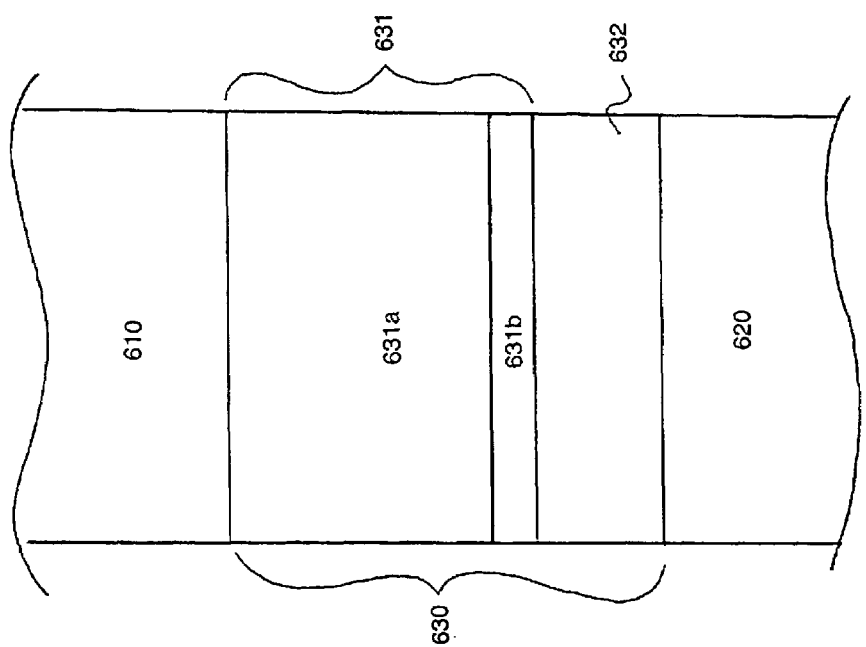

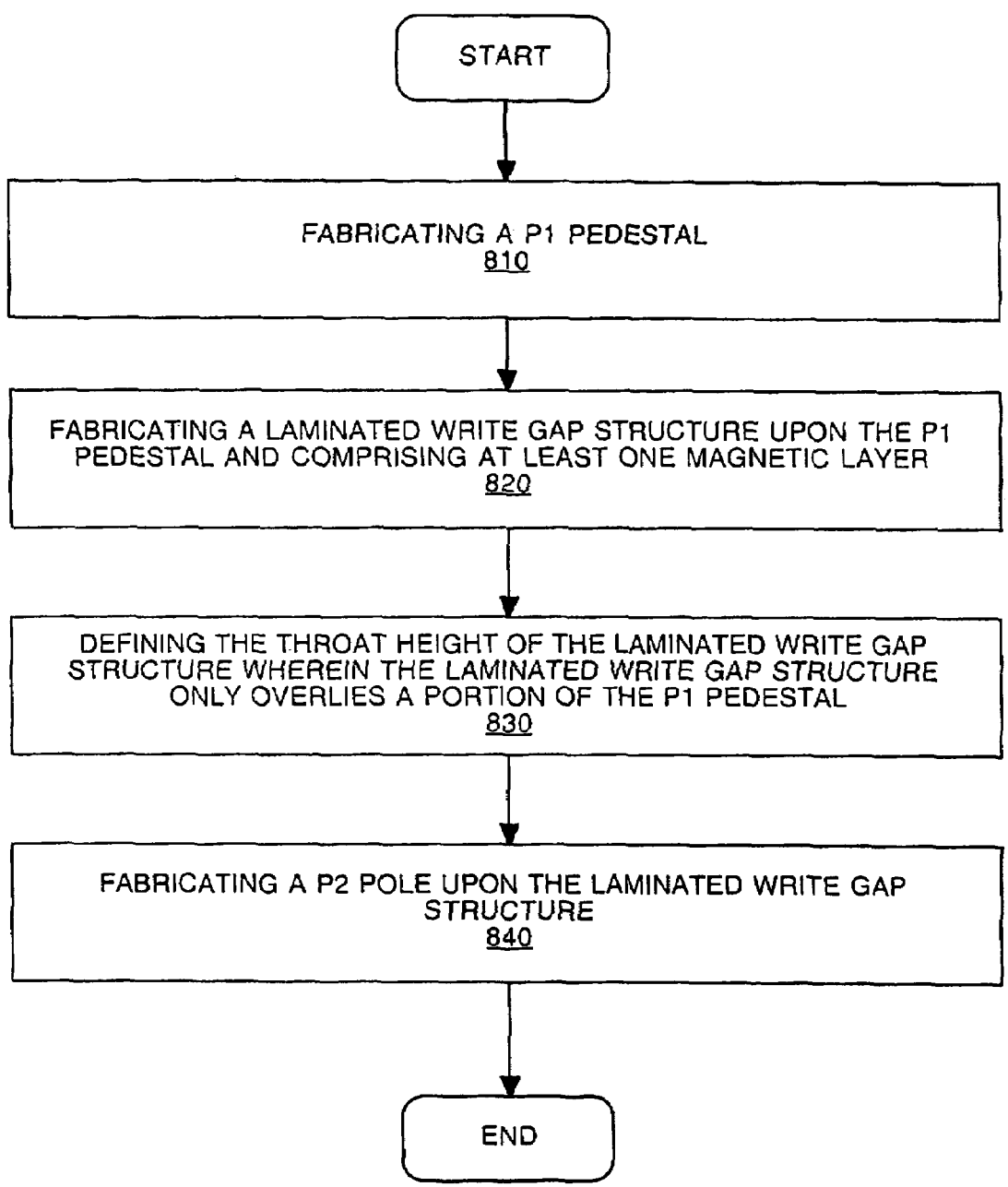

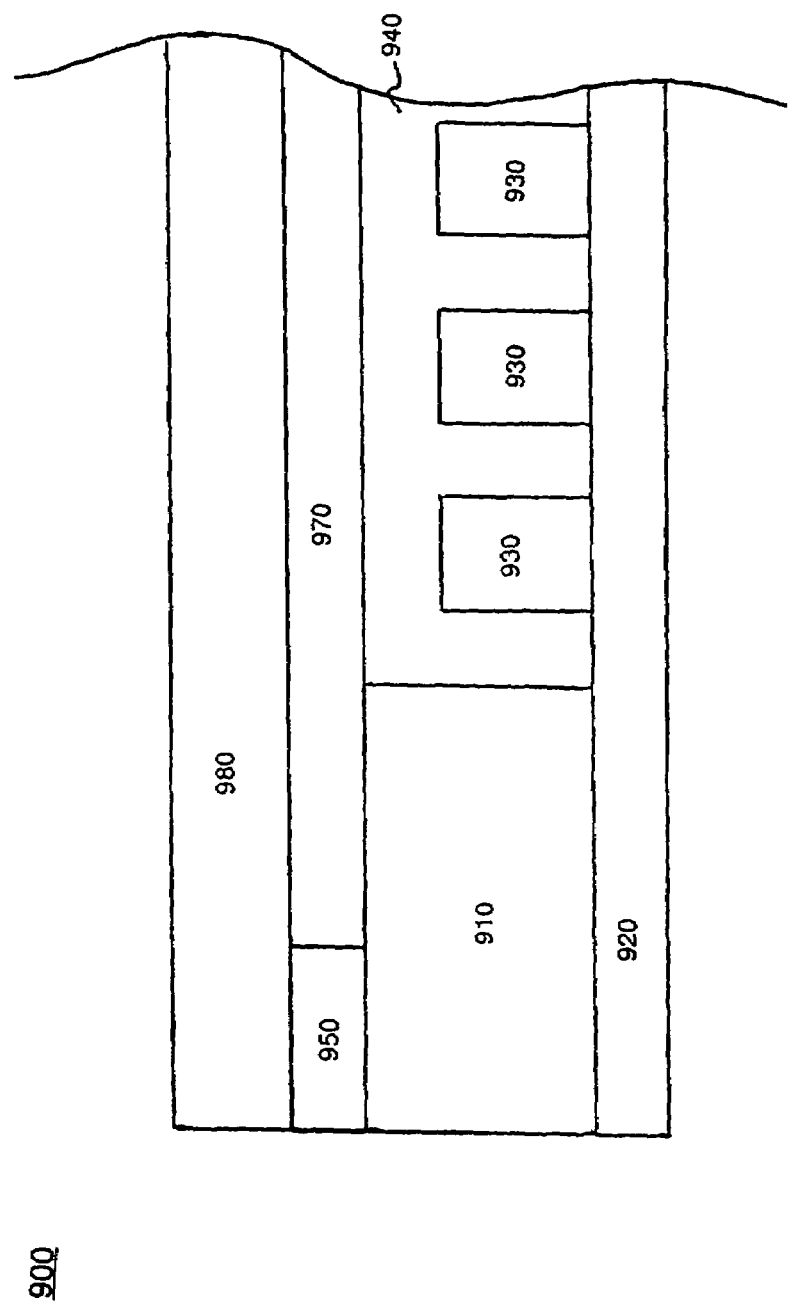

1000 FIGURE 10
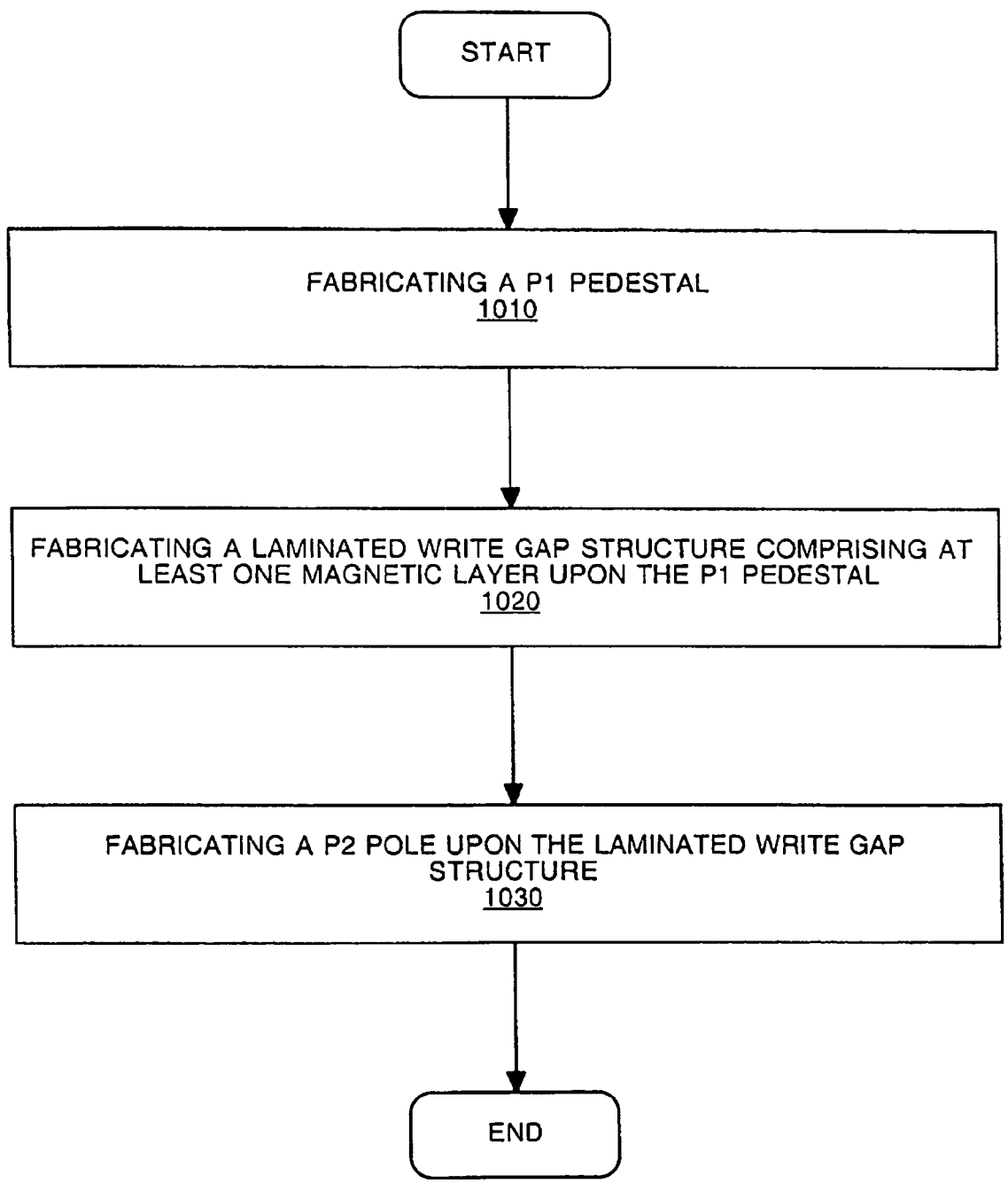

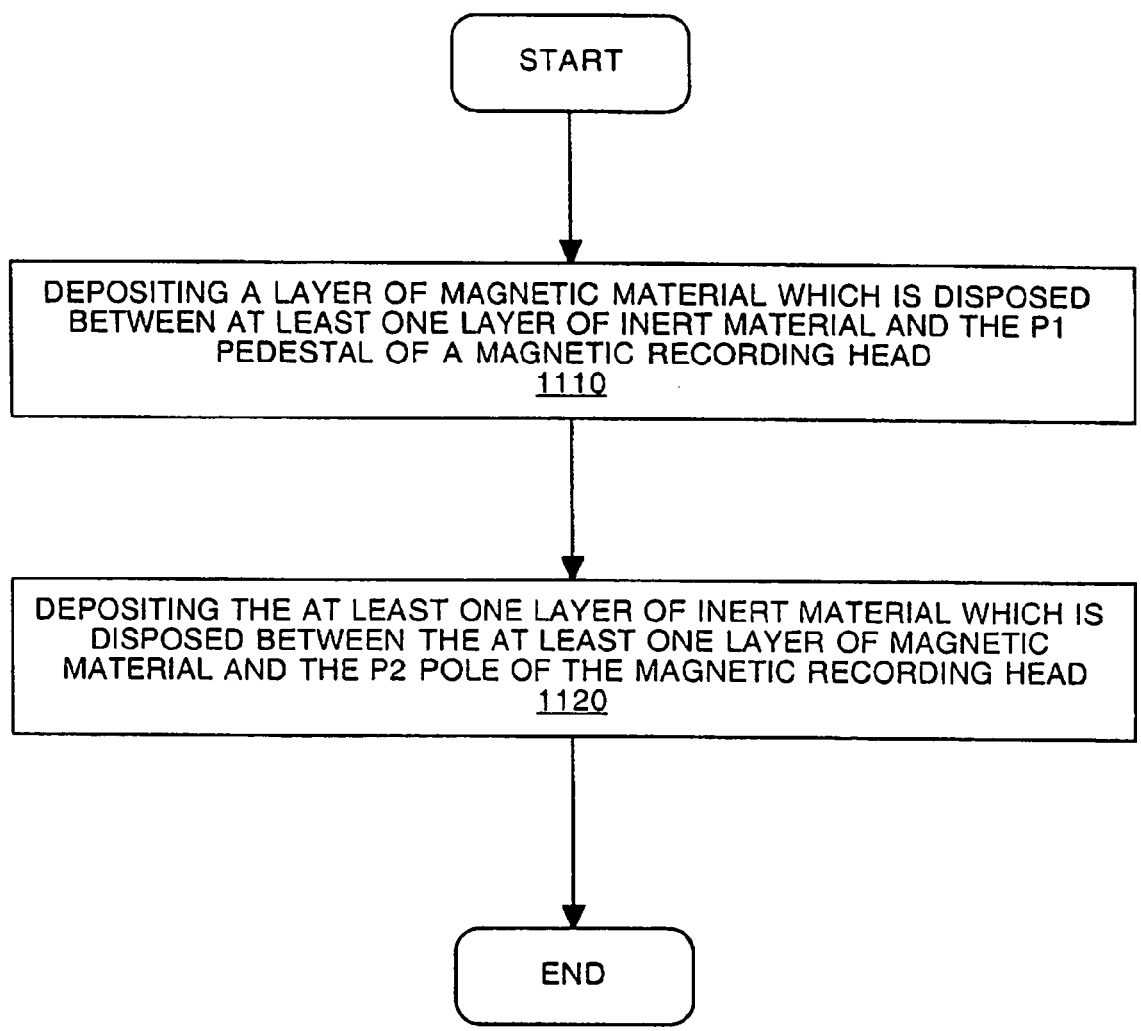

PROCESS FOR FABRICATING A MAGNETIC RECORDING HEAD WITH A LAMINATED WRITE GAP

RELATED APPLICATIONS

This Application is related to U.S. patent application, Ser. No. 11/104,333 by Wen-Chien Hsiao, Terence Lam, Bernd Lamberts, Yinshi Liu, Terry Olson, Michael Yang, and Samuel Yuan, filed on the same date as the present application, entitled "Laminated Write Gap to Improve Writer Performance", and assigned to the assignee of the present invention.

FIELD OF THE INVENTION

Embodiments of the present invention are related to the field of magnetic data storage devices.

BACKGROUND OF THE INVENTION

The data storage industry is always striving for innovations to improve areal density of hard disk drives. Improvements can be achieved through changes to the design of the head, the disk, or a combination of the two (e.g., perpendicular head recording).

FIGS. 1A and 1B show front and side views respectively of an exemplary prior art write head 100 of a hard disk drive. Write head 100 comprises an upper pole 110, also known as a "P2" pole, a lower pole 120, also known as a "P1 pedestal," or "P1P", and a write gap 130 disposed between the P1P and P2. Write head 100 further comprises a plurality of coils 140.

FIG. 2 shows the composition of an exemplary prior art write gap 130. Typically, write gap 130 comprises one or more layers of a magnetically inert material disposed between the P2 (110) and P1P (120) poles. For example, in FIG. 2, a first inert layer 210 is a layer of Rhodium which is approximately 900 angstroms (900 A) thick disposed above a second inert layer 220 of Tantalum which is approximately 100 angstroms (100 A) thick. In other prior art implementations, write gap 130 may comprise a layer of alumina, which is disposed between P2 (110) and P1P (120).

Returning now to FIGS. 1A and 1B, in operation, the surfaces of P2 (110) and P1P (120) adjacent to the gap (130) are saturated to generate a magnetic field, which magnetizes a recording medium (e.g., a magnetic disk). It is typically desired to maximize the magnetic flux density in the write gap to improve writing efficiency. However, when saturating write gap 130, additional magnetic fields are created in regions 150 and/or 160 of the P1P (120). These additional stray magnetic fields can be problematic because they are associated with a weak, unreadable signal which cannot reliably store magnetic charges on the recording medium. However, the stray fields can interfere with the storage of data on adjacent recording tracks of the recording medium by partially overwriting, or even erasing, the data on the adjacent tracks.

This is shown more clearly in FIG. 3, which shows the orientation of an exemplary prior art write head 100 relative to recording tracks of a recording medium. As shown in FIG. 3, write head 100 is disposed at an angle relative to direction of recording tracks 310, 320, and 330 and, when in operation, recording tracks move in the direction indicated by arrow 340. As shown in FIG. 3, each of the recording tracks comprises a write track (e.g., 311, 321, and 331 respectively) as well as erase bands (e.g., 310a, 310b, 320a, 320b, 330a and 330b respectively) which are adjacent to their respective write tracks.

As described above, when the surfaces of P2 (110) and P1P (120) are saturated, regions 150 and/or 160 may also emit a magnetic field. As shown in FIG. 3, region 150 overlies erase band 310b and generates a magnetic field, which magnetizes some regions in erase band 310b. The magnetic field generated in region 160 actually overlies write band 311. However, it is overwritten by the stronger magnetic field generated by write gap 130 as the recording track moves beneath write head 100.

Because the erase bands can interfere with data storage in adjacent recording tracks, a certain amount of offset (e.g., 350) between recording tracks, also referred to as "pitch" is typically provided. However, the extra space required to provide this offset reduces the density of data, which can be stored on the magnetic disk.

SUMMARY OF THE INVENTION

Accordingly, a method for fabricating a magnetic recording head is needed which facilitates reducing adjacent track interference in magnetic storage devices without significantly reducing the write efficiency of the magnetic recording head. While meeting the above stated need, it is also desirable that the above method be readily integrated into existing magnetic recording head fabricating processes.

Embodiments of the present invention recite processes for fabricating a write gap structure for a magnetic recording head. In one embodiment, at least one layer of inert material is deposited which is disposed proximate to the P2 pole of a magnetic recording head. A layer of magnetic material is deposited which is disposed between the layer of inert material and the P1 pedestal (P1P) of the magnetic recording head. In embodiments of the present invention, a second layer of inert material is deposited which is disposed between the layer of magnetic material and the P1P of the magnetic recording head. In embodiments of the present invention, the throat height of the write gap structure is defined wherein the layer of magnetic material and the inert layer only overlie a portion of the P1 pedestal of the magnetic recording head.

Embodiments of the present invention facilitate fabricating a write gap structure which reduces the generation of magnetic fields in the erase band because the layer of magnetic material draws magnetic flux away from regions of the magnetic recording head which overlie the erase bands when the magnetic recording head is in operation. As a result, more narrow erase bands are created and the pitch between recording tracks can be reduced, thus increasing data storage density in magnetic disks.

Furthermore, embodiments of the present invention can be readily incorporated into existing magnetic recording head fabrication processes without requiring significant investment in new equipment and/or retraining of personnel.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 2 shows the composition of an exemplary prior art write gap.

FIG. 3 shows the orientation of an exemplary prior art write head relative to write tracks.

FIGS. 4A and 4B are front and side views respectively of an exemplary write head fabricated in accordance with embodiments of the present invention.

FIG. 5 shows a front view of a write gap structure in fabricated accordance with embodiments of the present invention.

FIGS. 6A and 6B are front and side views respectively of an exemplary write head fabricated in accordance with embodiments of the present invention.

FIG. 7 shows a front view of a write gap structure fabricated in accordance with embodiments of the present invention.

FIG. 8 is a flowchart of a method for fabricating a write gap structure for a magnetic recording head in accordance with embodiments of the present invention.

FIGS. 9A, 9B, 9C, 9D, 9E, 9F, and 9G are cross section views showing a magnetic recording head fabricated in accordance with embodiments of the present invention.

FIG. 10 is a flowchart of a semiconductor for fabricating a magnetic recording head in accordance with embodiments of the present invention.

FIG. 11 is a flowchart of another semiconductor for fabricating a magnetic recording head in accordance with embodiments of the present invention.

DETAILED DESCRIPTION OF THE PREFERRED EMBODIMENT

Figure 1B:
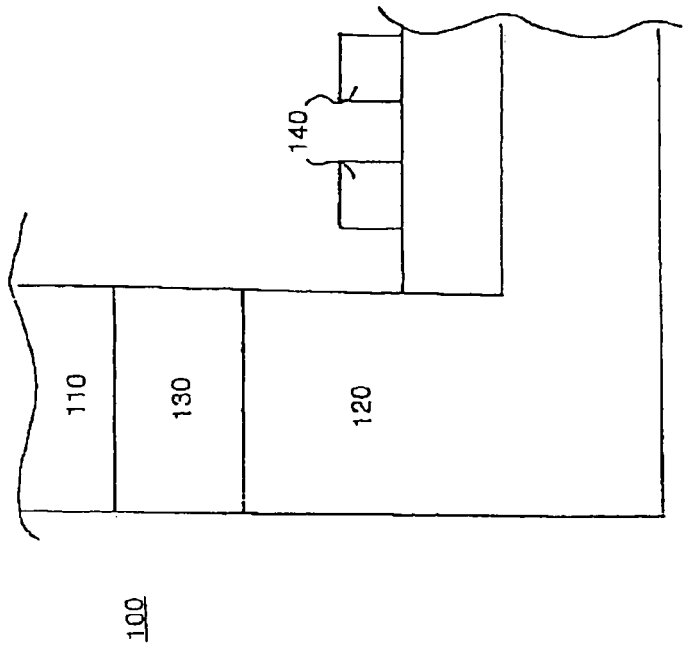
FIGS. 1A and 1B show front and side views respectively of an exemplary prior art write head.
Figure 1A:
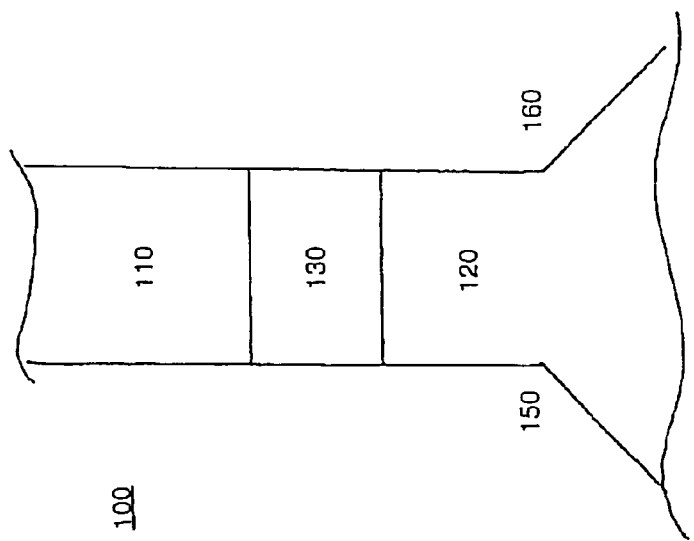

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents, which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the present invention are directed to a method for fabricating write gap structure for a magnetic recording head. In one embodiment, the write gap structure comprises a layer of inert material, which is disposed proximate to the P2 pole of a magnetic recording head and a layer of magnetic material which is disposed between the layer of inert material and the P1 pedestal (P1P) of the magnetic recording head. In embodiments of the present invention, the layer of inert material may comprise a laminate of inert layers.

In another embodiment of the present invention, the write gap structure comprises a first layer of inert material that is disposed proximate to the P2 pole of a magnetic recording head, a second layer of inert material is disposed proximate to the P1P of the magnetic recoding head, and a layer of magnetic material is disposed between the inert layers. In embodiments of the present invention, the first inert layer may comprise a laminate of inert layers.

Embodiments of the present invention may facilitate reducing the generation of magnetic fields in the erase band regions of a recording medium when the magnetic recording head is in operation. As a result, greater data storage density may be realized because the pitch between adjacent recording tracks can be decreased. In embodiments of the present invention, the throat height of the write gap structure may reduced compared to conventional metal filled write gap structures. Furthermore, the throat height of the write gap structure may vary according to the desired performance parameters for the magnetic recording head.

FIGS. 4A and 4B are front and side views respectively of an exemplary magnetic recording head 400 fabricated in accordance with embodiments of the present invention. In embodiments of the present invention, the magnetic recording head comprises a P2 pole 410, a P1P 420, a write gap structure 430, as well as a plurality of coils 440. It is noted that other components of magnetic recording head 400 are omitted for clarity. In the embodiment of magnetic recording head 400, write gap structure 430 is a laminated write gap structure comprising at least one layer of magnetic material and at least one layer of an inert material. This is shown in greater detail in FIG. 5 which shows a front view of write gap structure 430 in accordance with embodiments of the present invention. In FIG. 5, write gap structure 430 comprises a first layer of inert material 431 which is disposed proximate to P2 pole 410. In the present embodiment, first inert layer 431 comprises a laminate layer 431a and a laminate layer 431b. In one embodiment of the present invention, laminate layer 431a comprises a layer of rhodium (Rh) and laminate layer 431b comprises a layer of tantalum (Ta). While the present embodiment recites these materials specifically, it is appreciated that other inert materials may be utilized in first inert layer 431 in other embodiments of the present invention.

In the present embodiment, write gap structure 430 further comprises a layer of magnetic material 432 disposed between first inert layer 431 and P1P 420. In the embodiment of FIG. 5, magnetic material layer 432 comprises cobalt iron (CoFe). While the present embodiment recites a layer of cobalt iron, embodiments of the present invention are well suited to utilize other magnetic materials in magnetic material layer 432. In embodiments of the present invention, magnetic material layer 432 is for drawing magnetic flux away from fields which may form in regions 450 and/or 460 of magnetic recording head 400. In other words, magnetic material layer 432 facilitates reducing the adjacent track interference in the data region of adjacent track(s) (e.g., 321 in FIG. 3) while substantially maintaining the magnetic flux density in the write gap. In a conventional implementation, which does not use the laminated structure of the present invention, achieving a similar level of reduction in the adjacent track interference would necessitate a substantial reduction of the magnetic flux density in the write gap, thus reducing the writing efficiency of magnetic recording head 400. However, embodiments of the present invention can substantially reduce adjacent track interference without necessitating a substantial reduction in the flux density in the write gap.

In the present embodiment, write gap structure further comprises a second inert layer 433 which is disposed between magnetic material layer 432. In the present embodiment, second inert layer 433 comprises a layer of rhodium (Rh). While the present embodiment specifically recites second inert layer 433 as comprising a layer of rhodium, embodiments of the present invention are well suited to utilize other inert materials for second inert layer 433.

In embodiments of the present invention, write gap 430 is approximately one thousand angstroms (1000 A) high. In the embodiment of FIG. 5, first laminate layer 431a is a layer of rhodium which is approximately five hundred angstroms (500 A) thick and second laminate layer 431b is a layer of tantalum which is approximately one hundred angstroms (100 A) thick. In the embodiment of FIG. 5, magnetic material layer 432 is a layer of cobalt iron which is approximately three hundred angstroms (300 A) thick and second inert layer 433 is a layer of rhodium which is approximately one hundred angstroms (100 A) thick. While the present embodiment recites these dimensions specifically, it is appreciated that other dimensions may be used in other embodiments of the present invention.

Returning to FIG. 4B, in embodiments of the present invention, the throat height of write gap structure 430 is reduced with reference to the throat height of magnetic recording head 400. As shown in FIG. 4B, write gap structure 430 only overlies a portion of the throat height of magnetic recording head 400. For example, in the embodiment of FIG. 4B, the throat height of P1P 420 may be approximately two microns (2.0μ) thick. However, write gap structure 430 is less than two microns (2.0μ) thick (e.g., 0.15μ, 0.30μ, 0.45μ, or 0.60μ). Furthermore, the thickness of write gap structure 430 with reference to the throat height may be selected according to the desired magnetic characteristics for magnetic recording head 400. It is noted that in embodiments of the present invention, the throat height of P2 pole 410 may be different than the throat height of P1P 420.

FIGS. 6A and 6B are front and side views respectively of an exemplary magnetic recording head 600 fabricated in accordance with embodiments of the present invention. In embodiments of the present invention, the magnetic recording head comprises a P2 pole 610, a P1P 620, a write gap structure 630, as well as a plurality of coils 640. It is noted that other components of magnetic recording head 600 are omitted for clarity. In the embodiment of magnetic recording head 600, write gap structure 630 is a laminated write gap structure comprising at least one layer of magnetic material and at least one layer of an inert material. This is shown in greater detail in FIG. 7 which shows a front view of write gap structure 630 fabricated in accordance with embodiments of the present invention.

In FIG. 7, write gap structure 630 comprises a layer of inert material 631 which is disposed proximate to P2 pole 610. In the present embodiment, inert layer 631 comprises a laminate layer 631a and a laminate layer 631b. In one embodiment of the present invention, laminate layer 631a comprises a layer of rhodium (Rh) and laminate layer 631b comprises a layer of tantalum (Ta). While the present embodiment recites these materials specifically, it is appreciated that other inert materials may be utilized in first inert layer 631 in other embodiments of the present invention.

In the present embodiment, write gap structure 630 further comprises a layer of magnetic material 632 disposed between first inert layer 631 and P1P 620. In the embodiment of FIG. 7, magnetic material layer 632 comprises cobalt iron (CoFe). While the present embodiment recites a layer of cobalt iron, embodiments of the present invention are well suited to utilize other magnetic materials in magnetic material layer 632. In embodiments of the present invention, magnetic material layer 632 is for drawing magnetic flux away from fields which may form in regions 650 and/or 660 of magnetic recording head 600. In other words, magnetic material layer 632 facilitates reducing the adjacent track interference in the data region of adjacent track(s) (e.g., 321 in FIG. 3) while substantially maintaining the magnetic flux density in the write gap. In a conventional implementation which does not use the laminated structure of the present invention, achieving a similar level of reduction in the adjacent track interference would necessitate a substantial reduction of the magnetic flux density in the write gap, thus reducing the writing efficiency of magnetic recording head 600. However, embodiments of the present invention can substantially reduce adjacent track interference without necessitating a substantial reduction in the flux density in the write gap.

In embodiments of the present invention, write gap structure 630 is approximately one thousand angstroms (1000 A) high. In the embodiment of FIG. 7, first laminate layer 631a is a layer of rhodium which is approximately six hundred angstroms (600 A) thick and second laminate layer 631b is a layer of tantalum which is approximately one hundred angstroms (100 A) thick. In the embodiment of FIG. 7, magnetic material layer 632 is a layer of cobalt iron which is approximately three hundred angstroms (300 A) thick. While the present embodiment recites these dimensions specifically, it is appreciated that other dimensions may be used in other embodiments of the present invention.

Returning to FIG. 6B, in embodiments of the present invention, the throat height of write gap structure 630 is reduced with reference to the throat height of magnetic recording head 600. As shown in FIG. 6B, write gap structure 630 only overlies a portion of the throat height of magnetic recording head 600. For example, in the embodiment of FIG. 6B, the throat height of P1P 620 may be approximately two microns (2.0μ) thick. However, write gap structure 630 is less than two microns (2.0μ) thick (e.g., 0.15μ, 0.30μ, 0.45μ, or 0.60μ). Furthermore, the thickness of write gap structure 630 with reference to the throat height may be selected according to the desired magnetic characteristics for magnetic recording head 600. It is appreciated that in embodiments of the present invention, the throat height of P2 pole 610 may be different than the throat height of P1P 620.

Thus, embodiments of the present invention may reduce adjacent track interference for magnetic data storage systems without significantly reducing the write efficiency of the magnetic recording head. Furthermore, embodiments of the present invention may be fabricated using existing magnetic recording head equipment and processes. As a result, embodiments of the present invention can be economically and reliably fabricated.

Figure 9A:
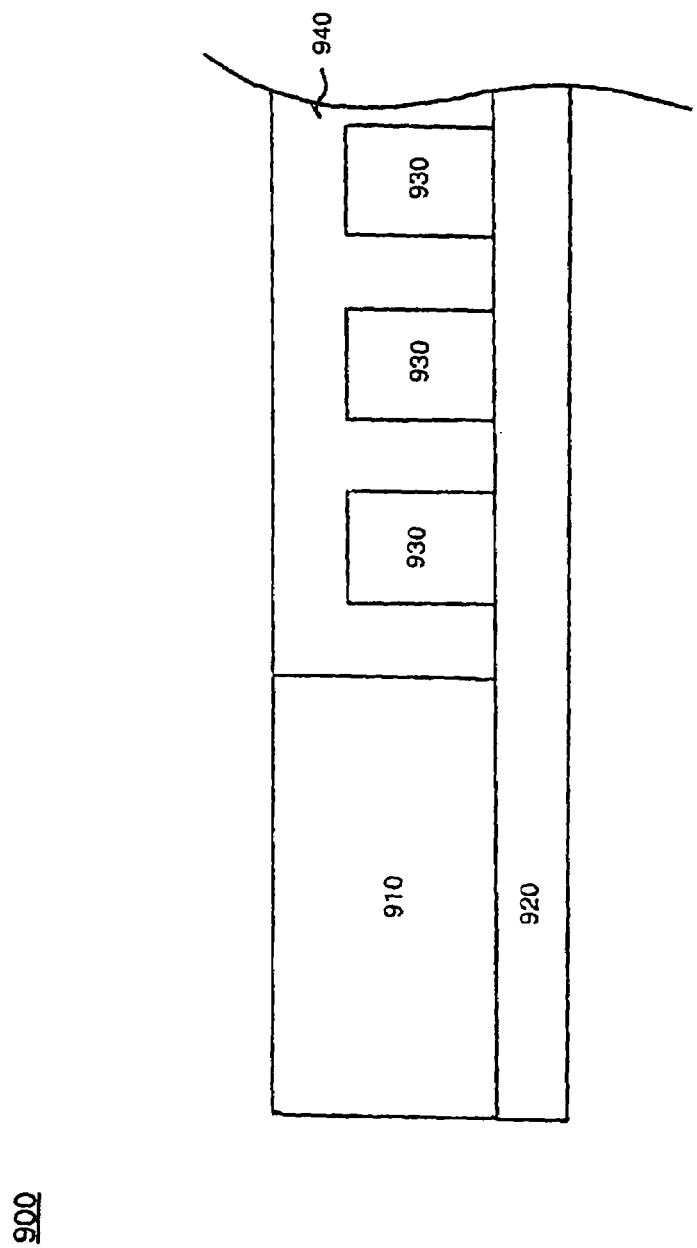

FIG. 8 is a flowchart of a semiconductor process for fabricating a write gap structure for a magnetic recording head in accordance with embodiments of the present invention. In step 810 of FIG. 8, a P1 pedestal of a magnetic recording head is fabricated. Referring now to FIG. 9A, a P1 pedestal (P1P) 910 is fabricated upon a P1 layer 920 of magnetic recording head 900. In FIG. 9, magnetic recording head further comprises a plurality of coils 930 which are disposed beneath a layer 940 of Alumina. Typically, the thickness of the layers shown in FIG. 9A is measured as a process control step. It is noted that other components of magnetic recording head 900 have been omitted for clarity. Furthermore, it is appreciated that some steps typically performed in magnetic recording head fabrication processes may be omitted from the following discussion for clarity.

Figure 9B:
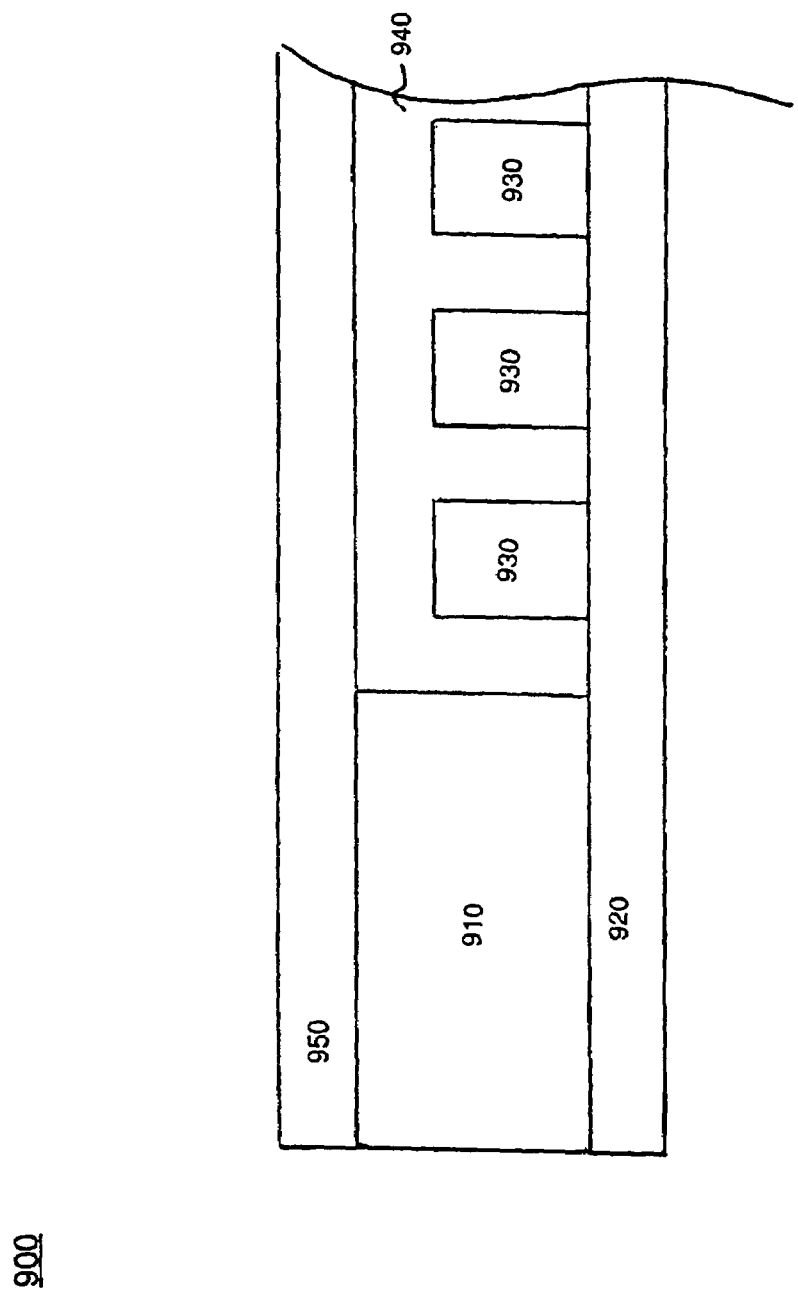

In step 820 of FIG. 8, a laminated write gap structure, comprising at least one magnetic layer, is fabricated upon the P1 pedestal. Referring now to FIG. 9B, a laminated write gap structure 950 is deposited upon P1P 910. In the embodiment of FIG. 9B, laminated write gap structure 950 is deposited as a blanket layer covering P1P 910 and Alumina layer 940. However, in other embodiments of the present invention, laminated write gap structure may be deposited in specific portions (e.g., only covering P1P 910 or a portion thereof) of magnetic recording head 900.

In one embodiment, the configuration of laminated write gap structure 950 is similar to write gap structure 630 shown in FIG. 7. In other words, a magnetic material layer 632 of cobalt iron which is approximately three hundred angstroms (300 A) thick is first deposited upon P1P 910 (e.g., P1P 620 of FIG. 7). Next, a laminate layer 631b is deposited upon magnetic material layer 632 which comprises a layer of tantalum (Ta) which is approximately one hundred angstroms (100 A) thick. Finally, laminate layer 631a is deposited upon laminate layer 631b and comprises a layer of rhodium (Rh) which is approximately six hundred angstroms (600 A) thick.

In another embodiment, the configuration of laminated write gap structure 950 is similar to write gap structure 430 shown in FIG. 5. In other words, an inert layer 433 is deposited upon the P1P (e.g., 420 of FIG. 5) which comprises a layer of rhodium (Rh) which is approximately one hundred angstroms (100 A) thick. Upon this, a magnetic material layer 432 is deposited which comprises a layer of cobalt iron which is approximately three hundred angstroms (300 A) thick. Then, a laminate layer 631b is deposited upon magnetic material layer 632 which comprises a layer of tantalum (Ta) which is approximately one hundred angstroms (100 A) thick. Finally, laminate layer 631a is deposited upon laminate layer 631b and comprises a layer of rhodium (Rh) which is approximately five hundred angstroms (500 A) thick. Again, it is noted that in embodiments of the present invention, other materials and/or other thicknesses of these layers may be deposited.

In embodiments of the present invention, an inspection of laminated write gap structure 950 may be performed to ensure that it is within production parameters. In one embodiment, a measurement of coupons embedded within laminated write gap structure 950 is performed. Coupons are small silicon wafers which are typically deposited when a layer of material is deposited in vacuum deposition processes. Subsequently, an analysis of the coupons is performed to ensure that the deposited layer is the correct thickness.

Figure 9C:
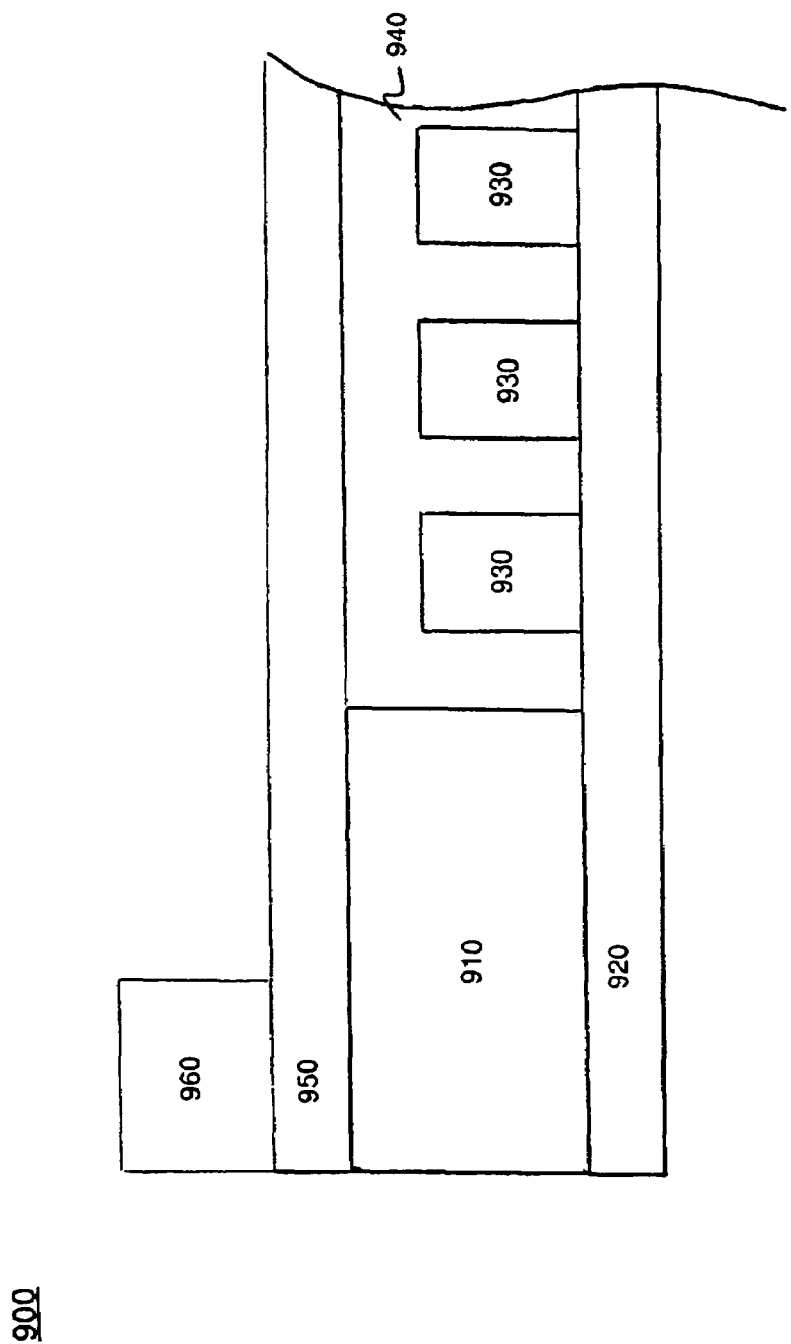

In step 830 of FIG. 8, the throat height of the laminated write gap structure is defined wherein the laminated write gap structure only overlies a portion of the P1 pedestal. Referring now to FIG. 9C, in embodiments of the present invention, the throat height of laminated write gap structure 950 is defined using a photo-lithography process. As shown in FIG. 9C, photo masking layer 960 overlies a portion of laminated write gap structure 950. It is noted that existing photo-lithographic processes may be used in embodiments of the present invention to create photo masking layer 960.

Figure 9D:
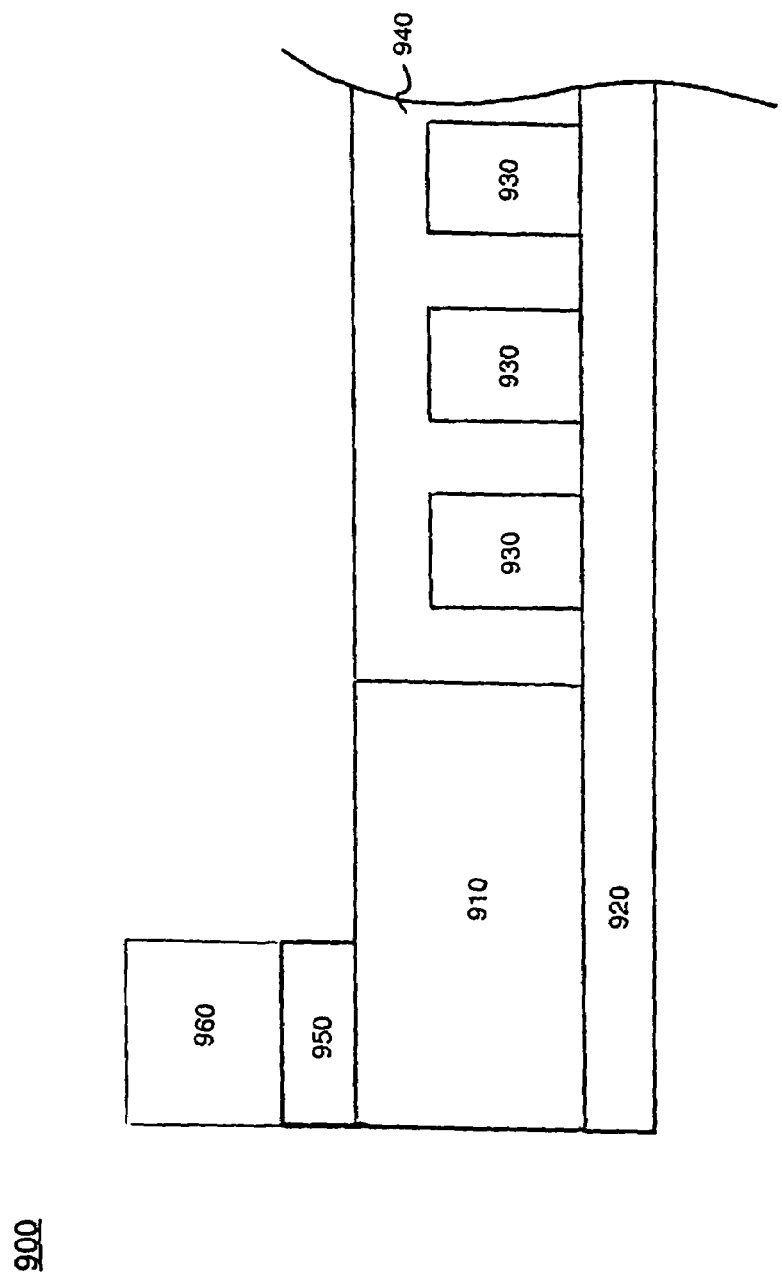

Referring now to FIG. 9D, a portion of laminated write gap structure has been removed. More specifically, the portion of laminated write gap structure 950 which is not underlying photo masking layer 960 is removed. In embodiments of the present invention, an ion milling process has been used to remove a portion of laminated write gap structure 950. In so doing, the throat height of the remaining portion of laminated write gap structure 950 is defined. While the present embodiment recites using an ion milling process specifically, it is appreciated that other methods may be used to remove portions of laminated write gap structure 950.

Figure 9E:
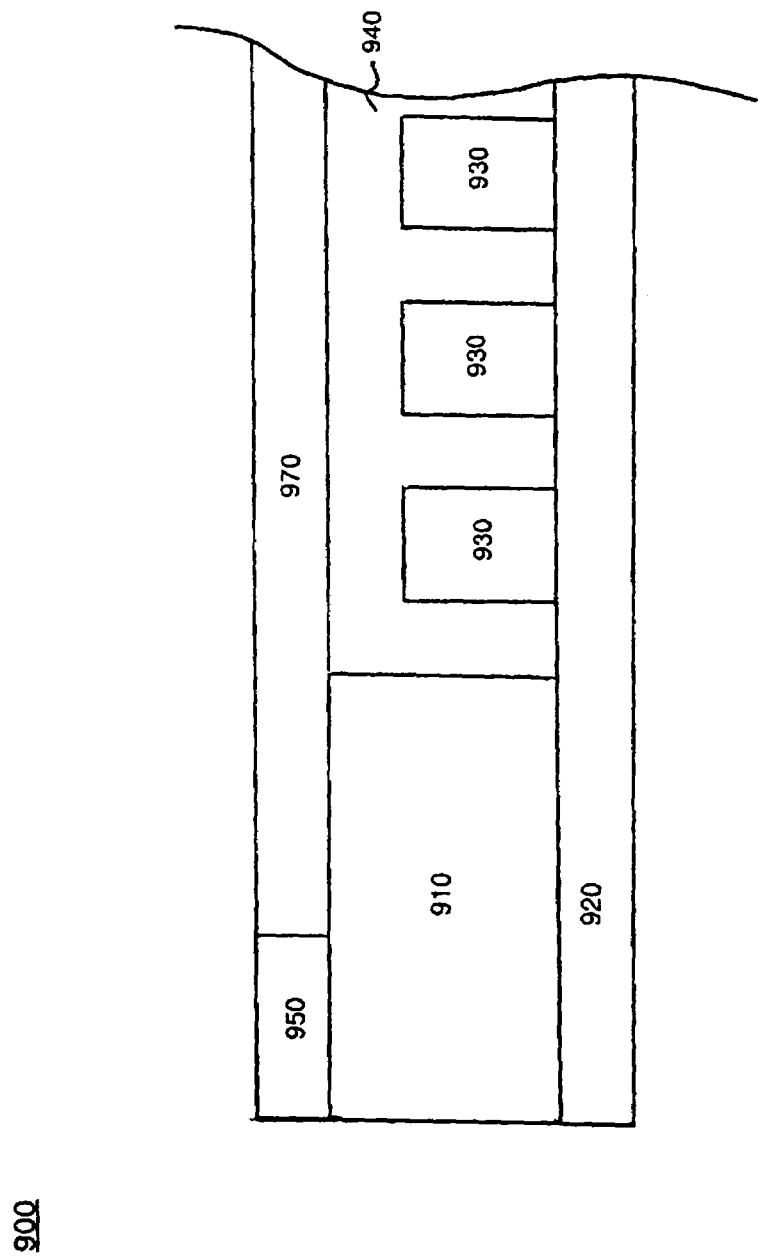
Figure 9G:
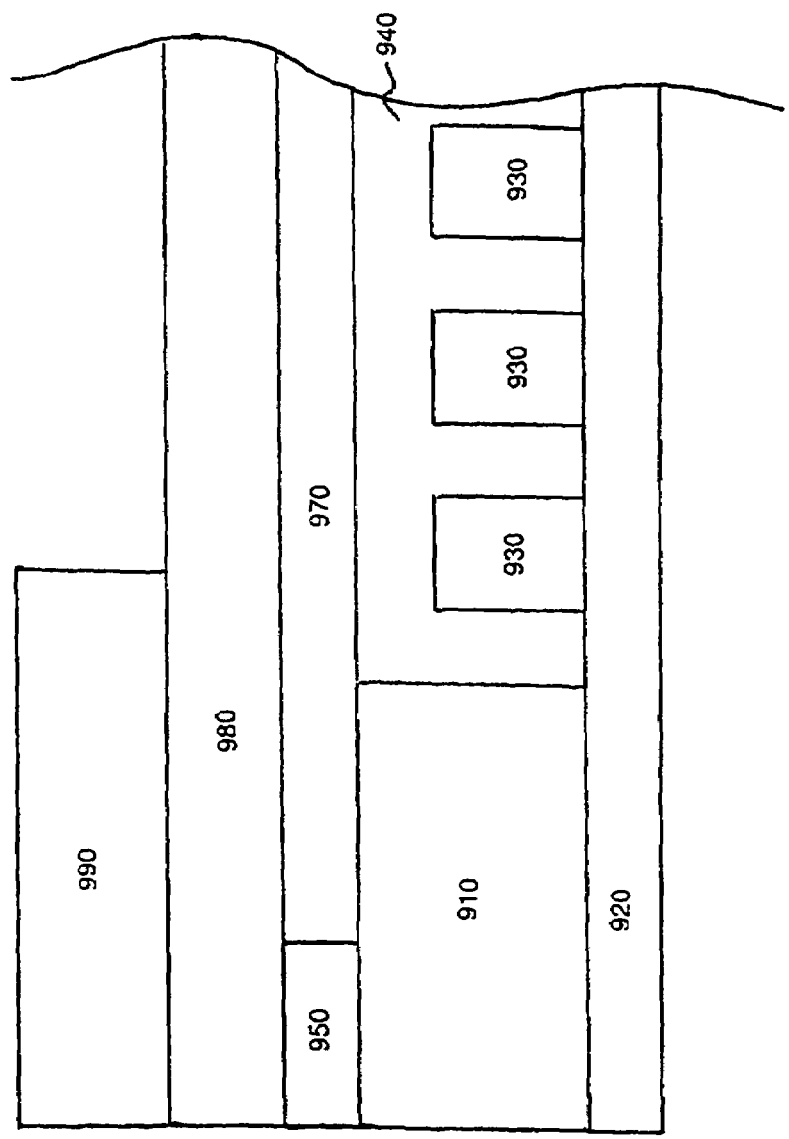

Referring now to FIG. 9E, the portion of laminated write gap structure that was removed is back-filled with a metal gap layer 970. In one embodiment, metal gap layer 970 comprises a layer of rhodium (Rh) which is approximately one thousand angstroms (1000 A) thick. However, in embodiments of the present invention, other materials may be used in metal gap layer 970. In conventional magnetic write heads, metal gap layer 970 typically comprises a layer of Alumina which would also cover the area of laminated write gap structure 950. In one embodiment, metal gap layer 970 is blanket deposited over photo masking layer 960 and Alumina layer 940. Then, an inspection may be performed (e.g., measurement of coupons deposited within metal gap layer 970) to ensure that metal gap layer 970 is within production parameters.

In embodiments of the present invention, photo masking layer 960, and the overlying portion of metal gap layer 970, are removed. In one embodiment, magnetic recording head 900 is baked to shrink photo masking layer 960 which is subsequently removed. After this, additional processing steps may be performed to further clean the surface of metal gap layer 970 and/or laminated write gap structure 950. For example, these areas may be bombarded with carbon dioxide ($CO_2$) particles followed by an ashing process (e.g., $H_2N_2$ ash or $O_2$ ash) to further clean the surface. After this, inspection of magnetic recording head 900 may be performed to ensure that process parameters have been met.

In step 840 of FIG. 8, a P2 pole is fabricated upon the laminated write gap structure. Referring now to FIG. 9F, a P2 seed layer 980 is deposited upon laminated write gap structure 950. In one embodiment, P2 seed layer 980 comprises a layer of cobalt iron which is approximately one thousand six hundred angstroms (1600 A) thick. In embodiments of the present invention, this is followed by the fabrication of P2 plate 990. In one embodiment, P2 plate 990 comprises a layer of nickel iron (NiFe) which is approximately 1.2 microns (1.2μ) thick. However, in other embodiments of the present invention, P2 plate 990 may be comprised of other materials and/or other thicknesses.

FIG. 10 is a flowchart of a process for fabricating a magnetic recording head in accordance with embodiments of the present invention. In step 1010 of FIG. 10, a P1 pedestal is fabricated. As discussed above with reference to step 810 of FIG. 8, P1 pedestal 910 is fabricated upon P1 layer 920.

In step 1020 of FIG. 10, a laminated write gap structure, comprising at least one magnetic layer, is fabricated upon the P1 pedestal. As discussed above with reference to steps 820 and 830 of FIG. 8, laminated write gap structure 950 is deposited and the throat height is defined.

In step 1030 of FIG. 10, a P2 pole is fabricated upon the laminated write gap structure. As discussed above with reference to step 840 of FIG. 8, in one embodiment of the present invention, P2 seed 980 and P2 plate 990 are fabricated upon laminated write gap structure 950 and metal gap layer 970.

FIG. 11 is a flowchart of a method for fabricating a magnetic recording head in accordance with embodiments of the present invention. In step 1110 of FIG. 11, a layer of magnetic material is deposited which is disposed between at least one layer of inert material and the P1 pedestal of a magnetic recording head. As discussed above with reference to FIG. 5 and FIG. 7, a layer of magnetic material (e.g., 432 of FIG. 5 and 632 of FIG. 7) is deposited which is disposed between at least one layer of inert material (e.g., 431 of FIG. 5 and 631 of FIG. 7) and the P1 pedestal (e.g., 420 of FIG. 5 and 620 of FIG. 7). In conventional write head implementations, the write gap is typically filled with Alumina. However, as described above, these conventional write head implementations also typically generate excessive magnetic fields in the erase bands. Embodiments of the present invention facilitate fabrication of magnetic recording heads which can reduce the generation of magnetic fields in the erase bands of the recording medium due to the layer of magnetic material in the write gap structure.

In step 1120 of FIG. 11, the at least one layer of inert material is deposited between the at least one layer of magnetic material and the P2 pole of the magnetic recording head. As discussed above with reference to FIG. 5 and FIG. 7, inert layers 431 and 631 are disposed between the layer of magnetic material (e.g., 432 and 632 respectively) and the P2 pole (e.g., 410 and 610 respectively) of the magnetic recording head. Furthermore, in embodiments of the present invention, this layer of inert material comprises a laminate of rhodium and tantalum. Conventional magnetic head implementations typically utilize Alumina in the write gap and do not reduce the generation of magnetic fields in the erase bands of the recording medium. Because the layer of magnetic material deposited in embodiments of the present invention, a reduction in adjacent track interference is realized, thus facilitating greater data density on the recording medium.

The preferred embodiment of the present invention, a process for fabricating a magnetic recording head with a laminated write gap, is thus described. While the present invention has been described in particular embodiments, it should be appreciated that the present invention should not be construed as limited by such embodiments, but rather construed according to the following claims.

What is claimed is:

1. A method for fabricating a magnetic recording head comprising:

fabricating a pedestal structure;

fabricating a laminated write gap structure comprising at least one magnetic layer upon said pedestal structure, wherein said laminated write gap structure has a throat height, and wherein said throat height only overlies a portion of the pedestal structure; and fabricating an upper pole upon the laminated write gap structure, wherein, said laminated write gap structure further comprises a first inert layer disposed between said at least one magnetic layer and said upper pole; and wherein said first inert layer comprises a laminate of rhodium (Rh) and tantalum (Ta).

2. The method as recited in claim 1 wherein said laminated write gap structure further comprises a second inert layer disposed between said at least one magnetic layer and said pedestal structure.

3. The method as recited in claim 2 wherein said second inert layer comprises a layer of rhodium (Rh).

4. The method as recited in claim 1 wherein said at least one magnetic layer comprises a layer of cobalt iron (CoFe).

* * * * *